US012491881B2

(12) United States Patent
Bellinger (10) Patent No.: US 12,491,881 B2
(45) Date of Patent: Dec. 9, 2025

(54) SYSTEMS AND METHODS FOR DOWNHILL SPEED CONTROL OF A VEHICLE

(71) Applicant: Cummins Inc., Columbus, IN (US)

(72) Inventor: Steven M. Bellinger, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/729,026

(22) PCT Filed: Jan. 30, 2023

(86) PCT No.: PCT/US2023/061551
§ 371 (c)(1),
(2) Date: Jul. 15, 2024

(87) PCT Pub. No.: WO2023/158918
PCT Pub. Date: Aug. 24, 2023

(65) Prior Publication Data
US 2025/0108807 A1    Apr. 3, 2025

Related U.S. Application Data

(60) Provisional application No. 63/268,005, filed on Feb. 15, 2022.

(51) Int. Cl.
*B60W 10/06* (2006.01)
*B60W 10/10* (2012.01)
(Continued)

(52) U.S. Cl.
CPC ...... *B60W 30/18136* (2013.01); *B60W 10/06* (2013.01); *B60W 10/10* (2013.01); *B60W 10/18* (2013.01); *B60W 30/146* (2013.01);
*B60W 2520/105* (2013.01); *B60W 2540/10* (2013.01); *B60W 2552/15* (2020.02); *B60W 2710/06* (2013.01); *B60W 2710/1005* (2013.01); *B60W 2710/18* (2013.01)

(58) Field of Classification Search
CPC ......... B60W 30/18136; B60W 30/146; B60W 10/06; B60W 10/10; B60W 10/18; B60W 2520/105; B60W 2540/10; B60W 2552/15; B60W 2710/1005; B60W 2710/06; B60W 2710/18
USPC ......... 701/54, 65, 94, 95; 477/110, 186, 187
See application file for complete search history.

(56) References Cited

U.S. PATENT DOCUMENTS 6,349,253 B1    2/2002  Bellinger
6,530,862 B2 *  3/2003  Kolmanovsky ......... F02D 13/04
                                                    477/118

(Continued)

OTHER PUBLICATIONS

International Search Report and Written Opinion for International patent application No. PCTU2361551, filed Jan. 30, 2023, mailed May 25, 2023, 9 pgs.

*Primary Examiner* — Roger L Pang
(74) *Attorney, Agent, or Firm* — Taft, Stettinius & Hollister LLP (57) ABSTRACT

A vehicle includes a powertrain with a prime mover, a transmission with a number of gears, and foundation brakes. The speed of the vehicle along a downhill route segment is automatically controlled toward a target speed by prioritizing the use of engine braking power and gear downshifting in the transmission over application of the vehicle's foundation brakes.

16 Claims, 4 Drawing Sheets

(51) Int. Cl.
    *B60W 10/18*     (2012.01)
    *B60W 30/14*     (2006.01)
    *B60W 30/18*     (2012.01)

(56) References Cited

U.S. PATENT DOCUMENTS

| | | |
|---|---|---|
| 8,731,788 B2 | 5/2014 | Sujan et al. |
| 8,744,730 B2 | 6/2014 | Guggolz et al. |
| 9,616,895 B2 | 4/2017 | Nefcy et al. |
| 9,797,505 B2 | 10/2017 | Dufford |
| 9,835,248 B2 | 12/2017 | Sujan et al. |
| 10,647,320 B2 | 5/2020 | Carlsson et al. |
| 10,737,699 B2 | 8/2020 | Dickson et al. |
| 10,948,074 B2 | 3/2021 | Ganske et al. |
| 2006/0293822 A1 | 12/2006 | Lattemann et al. |
| 2014/0172256 A1 | 6/2014 | Landes et al. |
| 2015/0073644 A1 | 3/2015 | Reed et al. |
| 2019/0368601 A1 | 12/2019 | Jacobs et al. |
| 2020/0023819 A1* | 1/2020 | Noumura .............. G05D 1/0088 |
| 2021/0054926 A1 | 2/2021 | Kawale et al. |
| 2021/0188271 A1* | 6/2021 | Dempsey .............. B60W 10/10 |
| 2021/0291831 A1 | 9/2021 | Rossi |

\* cited by examiner

SYSTEMS AND METHODS FOR DOWNHILL SPEED CONTROL OF A VEHICLE

CROSS-REFERENCE TO RELATED APPLICATION

The present application claims priority to International Patent Application No. PCT/US23/61551, filed Jan. 30, 2023, which claims the benefit of the filing date of and priority to U.S. Provisional Application Ser. No. 63/268,005 filed on Feb. 15, 2022, the contents of which are incorporate herein by reference in their entirety.

FIELD OF THE INVENTION

The present application relates to vehicle speed control associated with downhill segments of a route.

BACKGROUND

Vehicle speed can be controlled automatically based on current and/or look ahead route data in order to produce target speeds for the vehicle that achieve one or more mission parameters, such as to reduce fuel consumption, increase fuel economy, manage duty cycles, meet safety requirements, etc. Many operating levers can be employed for vehicle speed control during downhill segments of a route. Such operating levers may include, for example, automatically downshifting the transmission to a lower gear ratio to elevate engine speed and resultant retarder torque. Other operating levers for downhill vehicle speed control include modulation of braking power as a function of road slope or variations in grade against a target vehicle speed, managing engine parasitic devices/accessories to increase gross available braking power, or adaptive cruise control technology that employs engine and vehicle foundation (friction) brakes against a target speed.

There are disadvantages with employing these types of operating levers in downhill speed control. For example, automatic gear downshifting may be ineffective under certain operating conditions as such approaches employ only a single gear downshift at a time, which may not achieve an optimal level of retarding performance depending on the engine speed. In another example, approaches that mainly or overly employ the foundation brakes for speed control can result in the over-use of the foundation brakes, creating premature wear, over-heating, and other issues. Therefore, there remains a significant need for the unique apparatuses, methods and systems disclosed herein.

DISCLOSURE OF ILLUSTRATIVE EMBODIMENTS

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY OF THE DISCLOSURE

One embodiment is a unique system including optimization of vehicle speed control during operations associated with a downhill segment of a route. In an embodiment, a vehicle includes a powertrain with a prime mover, a transmission with a number of gears, and foundation brakes. The speed of the vehicle along a downhill route segment is automatically controlled toward a target speed by prioritizing the use of engine braking power and gear downshifting in the transmission over application of the vehicle's foundation brakes. In an embodiment, the current speed of the vehicle is automatically evaluated against a target or terminal speed without any operator input or request to adjust the vehicle speed. Further embodiments, forms, objects, features, advantages, aspects, and benefits shall become apparent from the following description and drawings.

DETAILED DESCRIPTION OF ILLUSTRATIVE EMBODIMENTS

Figure 1:
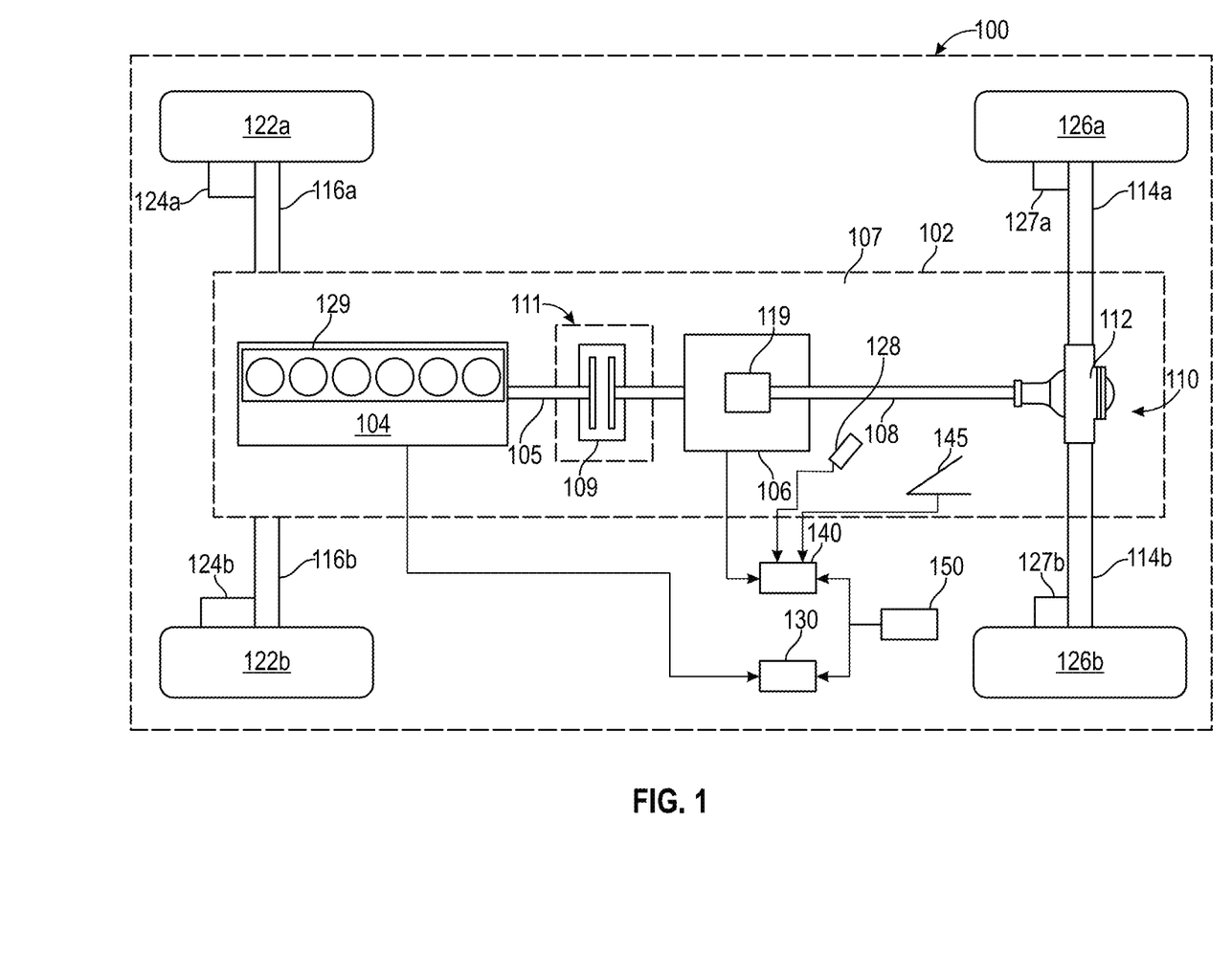
FIG. 1 is a schematic illustration of a vehicle with a control system for controlling the speed of the vehicle.

With reference to FIG. 1, there is illustrated a schematic view of an exemplary vehicle 100 including a powertrain 102 incorporated within vehicle 100. In the illustrated embodiment, the powertrain 102 includes a prime mover 104, such as an internal combustion engine, structured to generate power for the vehicle 100. The powertrain 102 further includes a transmission 106 connected to the prime mover 104 for adapting the output torque of the prime mover 104 and transmitting the output torque to a driveline 107 including drive shaft 108. In the illustrated embodiment, the transmission 106 may be disengageably connected to an engine crankshaft 105 via a clutch 109.

In other embodiments, the transmission 106 may be disengageably connected to an engine crankshaft 105 and the engagement and disengagement may be by operation of a master clutch provided at the front of the transmission, by operation of the transmission to place a gear in a neutral condition, or by other clutch and/or gearing arrangements. Various embodiments contemplate that transmission 106 may be an automatic transmission, an automated manual transmission, a manual transmission or any other suitable transmission with a disconnect device 111 that is operable to selectively engage and disengage engine 104 from driveline 107.

In the rear wheel drive configuration illustrated for vehicle 100, the driveline 107 of powertrain 102 includes a final drive 110 having a rear differential 112 connecting the drive shaft 108 to rear axles 114a, 114b. It is contemplated that the components of powertrain 102 may be positioned in different locations throughout the vehicle 100. In one non-limiting example of a vehicle 100 having a front wheel drive configuration, transmission 106 may be a transaxle and final drive 110 may reside at the front of the vehicle 100, connecting front axles 116a and 116b to the engine 104 via the transaxle. It is also contemplated that in some embodiments the vehicle 100 is in an all-wheel drive configuration.

In the illustrated embodiment, vehicle 100 includes two front wheels 122a, 122b mounted to front axles 116a, 116b, respectively. Vehicle 100 further includes two rear wheels 126a, 126b mounted to rear axles 114a, 114b, respectively. It is contemplated that vehicle 100 may have more or fewer wheels than illustrated in FIG. 1. Vehicle 100 also includes foundation brakes 124a, 124b, 127a, 127b to mechanically slow one or more wheels 122a, 122b, 126a, 126b, respectively, upon application of a brake pedal 128 and/or automatically in response to one or more vehicle speed control outputs. Vehicle 100 also includes an engine braking system 129 operable to retard prime mover 104 and slow vehicle 100 without friction braking such as by compression release braking, exhaust braking, etc. Vehicle 100 may also include various components not shown, such as a fuel system including a fuel tank, a front differential, a suspension, an engine intake system and an exhaust system, which may include an exhaust aftertreatment system, just to name a few examples. In certain embodiments vehicle 100 may include an electric machine and a batteries of appropriate capacity to provide a hybrid electric powertrain, a fuel cell, or other power source.

Vehicle 100 includes an electronic or engine control unit (ECU) 130, sometimes referred to as an electronic or engine control module (ECM), or the like, which is directed to regulating and controlling the operation of engine 104. An accelerator pedal 145 and/or other throttle control mechanism can be connected to ECU 130 to initiate fueling by an operator. A transmission control unit (TCU) 140 is illustrated in vehicle 100, which is directed to the regulation and control of transmission 106 operation. ECU 130 and TCU 140 are each in operative communication with a plurality of vehicle sensors (not shown) in vehicle 100 for receiving and transmitting operating conditions of vehicle 100, such as temperature conditions, pressure conditions, speed conditions, fuel conditions, flow conditions to and from the engine, terrain conditions, weather conditions, global positioning system (GPS) data, and vehicle mass, for example. It is contemplated that ECU 130 and TCU 140 may be integrated within the engine 104 and transmission 106, respectively.

Vehicle 100 further includes a vehicle spend management (VSM) controller or control unit 150, which may be directed to the control of the operations described herein and/or directed toward an intermediary control for the regulation and control of the powertrain 102 in vehicle 100. The VSM control unit 150 is in operative communication with the ECU 130 and TCU 140. In certain embodiments, a portion or all of the of the VSM control unit 150 may be integrated within the ECU 130 or the TCU 140 or other vehicle control unit. In still other embodiments, at least the VSM control unit 150 communicates with ECU 130 and/or TCU 140 over a datalink provided by a wired or wireless connection so that outputs of VSM control unit 150 that are determined independently of EVU 130 and/or TCU 140 can be provided to the ECU 130 and/or TCU 140.

VSM control unit 150 may further be in operative communication with one or more of the plurality of vehicle sensors in vehicle 100 for receiving and transmitting conditions of vehicle 100, such as temperature and pressure conditions, route conditions, terrain conditions, speed conditions, and weather conditions, for example. It is contemplated that at least a portion of the conditions and/or measured inputs used for interpreting signals by the VSM control unit 150 may be received from ECU 130 and/or TCU 140, in addition to or alternatively to the plurality of vehicle sensors. Furthermore, the VSM control unit 150 may include one or more processors or controllers. Such as an idle coast management (ICM) controller, motoring controller, etc.

The VSM control unit 150 and/or ECU 130 and TCU 140 includes stored data values, constants, and functions, as well as operating instructions stored on, for example, a computer readable medium. Any of the operations of exemplary procedures described herein may be performed at least partially by the VSM control unit 150. In certain embodiments, the VSM control unit 150 includes one or more controllers structured to functionally execute the operations of the controller. Further details of certain exemplary embodiments of controller operations are discussed below. Operations illustrated are understood to be exemplary only, and operations may be combined or divided, and added or removed, as well as re-ordered in whole or part, unless stated explicitly to the contrary herein.

Certain operations described herein include operations to interpret or determine one or more parameters. Interpreting or determining, as utilized herein, includes receiving values by any method, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, and/or by receiving a value by which the interpreted or determined parameter can be calculated, and/or by referencing a default value that is interpreted or determined to be the parameter value.

ECU 130, TCU 140, and VSM control unit 150 are exemplary components of an integrated circuit-based electronic control system (ECS) which may be configured to control various operational aspects of vehicle 100 and powertrain 102 as described in further detail herein. An ECS according to the present disclosure may be implemented in a number of forms and may include a number of different elements and configurations of elements. In certain preferred forms an ECS may incorporate one or more microprocessor-based or microcontroller-based electronic control units sometimes referred to as electronic control modules. An ECS according to the present disclosure may be provided in forms having a single processing or computing component, or in forms comprising a plurality of operatively coupled processing or computing components; and may comprise digital circuitry, analog circuitry, or a hybrid combination of both of these types. The integrated circuitry of an ECS and/or any of its constituent processors/controllers or other components may include one or more signal conditioners, modulators, demodulators, arithmetic logic units (ALUs), central processing units (CPUs), limiters, oscillators, control clocks, amplifiers, signal conditioners, filters, format converters, communication ports, clamps, delay devices, memory devices, analog to digital (A/D) converters, digital to analog (D/A) converters, and/or different circuitry or functional components as would occur to those skilled in the art to provide and perform the communication and control aspects disclosed herein.

One exemplary embodiment of VSM control unit 150 is configured to dynamically adjust the vehicle speed toward a target speed while the vehicle is along a downhill segment of a route. For example, VSM control unit 150 can use look ahead data and vehicle parameters such as vehicle mass to determine or predict a terminal speed for the vehicle, compare the terminal speed with a speed limit along the downhill route segment, and select the target speed for the vehicle as the lesser of the terminal speed and the speed limit. As used herein, the terminal speed of the vehicle is the speed in which the vehicle traverses the downhill route segment safely based on the road slope or grade in view of the vehicle's operating parameters, such as vehicle mass, rear axle ratio, rolling radius of the tires, and/or other parameters that impact the vehicle's ability to traverse the downhill route segment. The terminal speed may include a predicted terminal speed that involves driver control of the vehicle, and/or a predicted terminal speed that is attained without driver intervention or control of the vehicle.

It is contemplated the look ahead data used to determine the terminal speed may be include data collected using a number of techniques including, for example, terrain data, environmental conditions, road surface conditions, a proximity or position of other vehicles, a spacing or distance to one or more other vehicles, a speed of one or more other vehicles, route conditions, upcoming grade or road slope conditions, GPS data, mapping data, inputs from one or more other vehicles or a forward looking radar system, and/or one or more models of the vehicle 100 including estimated mass, aerodynamic drag, rear axle ratio, rolling radius of the tires, and other conditions associated with vehicle 100. Terrain data may be gathered from a grade sensor such as an inclinometer or computer model structured to determine or estimate grade information from a map or geographic information system (GIS) data set which may be provided on board a vehicle or received via transmission from a remote location or combinations of such techniques.

Figure 2:
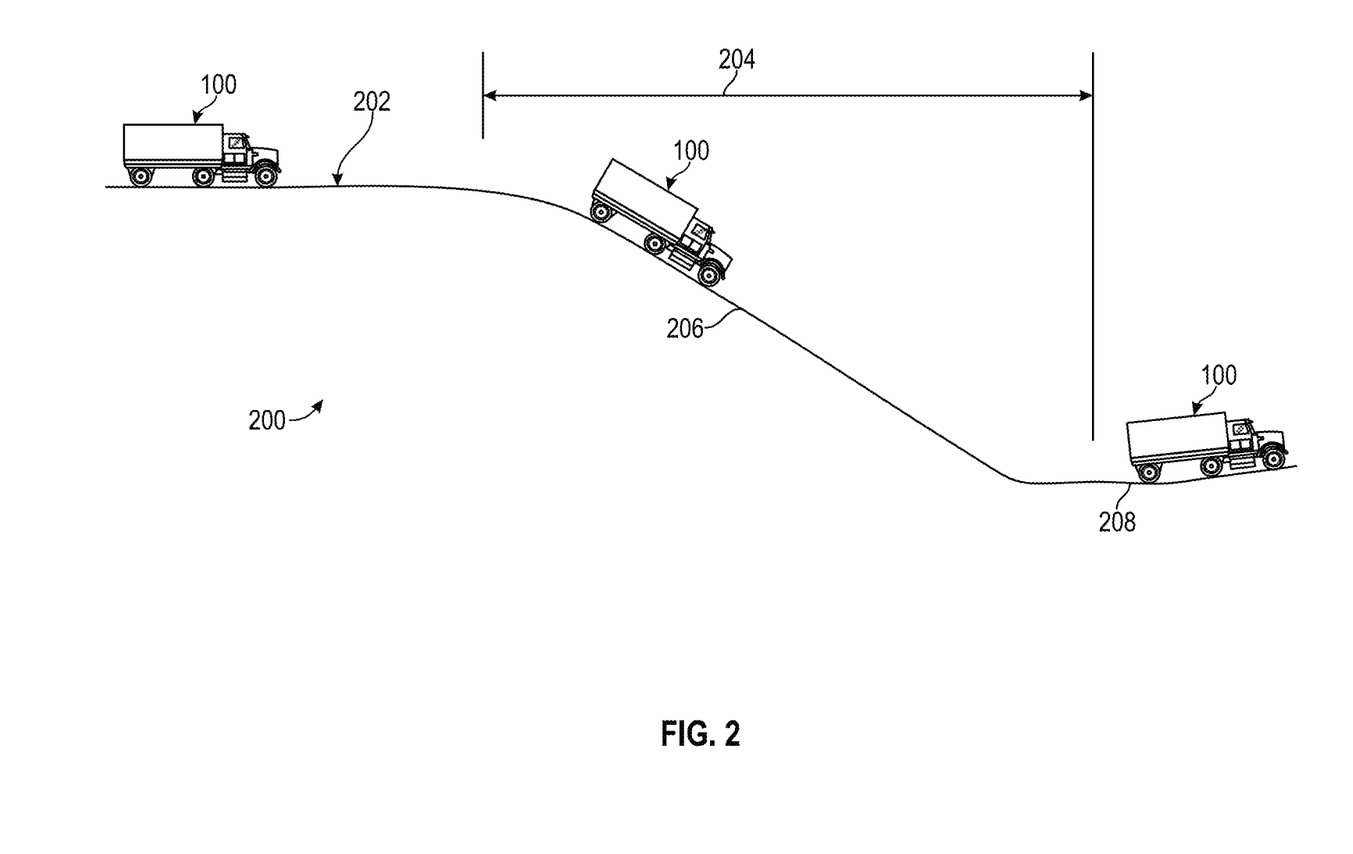
FIG. 2 is a diagram of an example portion of a route for the vehicle.

With reference to FIG. 2, there is illustrated a diagram 200 depicting certain aspects of the vehicle route during certain operations of the vehicle 100. As illustrated FIG. 2, a vehicle 100 traveling on a route 202 may be provided with look ahead information 204 regarding future route or road grade. In the illustrated example, look-ahead or future road grade information indicates that vehicle 100 will travel over a downhill route segment 206 having a downhill road grade and, subsequently, will travel over a route segment 208 having a flat road grade. In response to this look ahead information, the control systems discloses herein are operable to modulate the vehicle speed to a target speed while effectively prioritizing the use of engine braking power and gear downshifting over the use of the vehicle's foundation brakes.

Figure 3A:
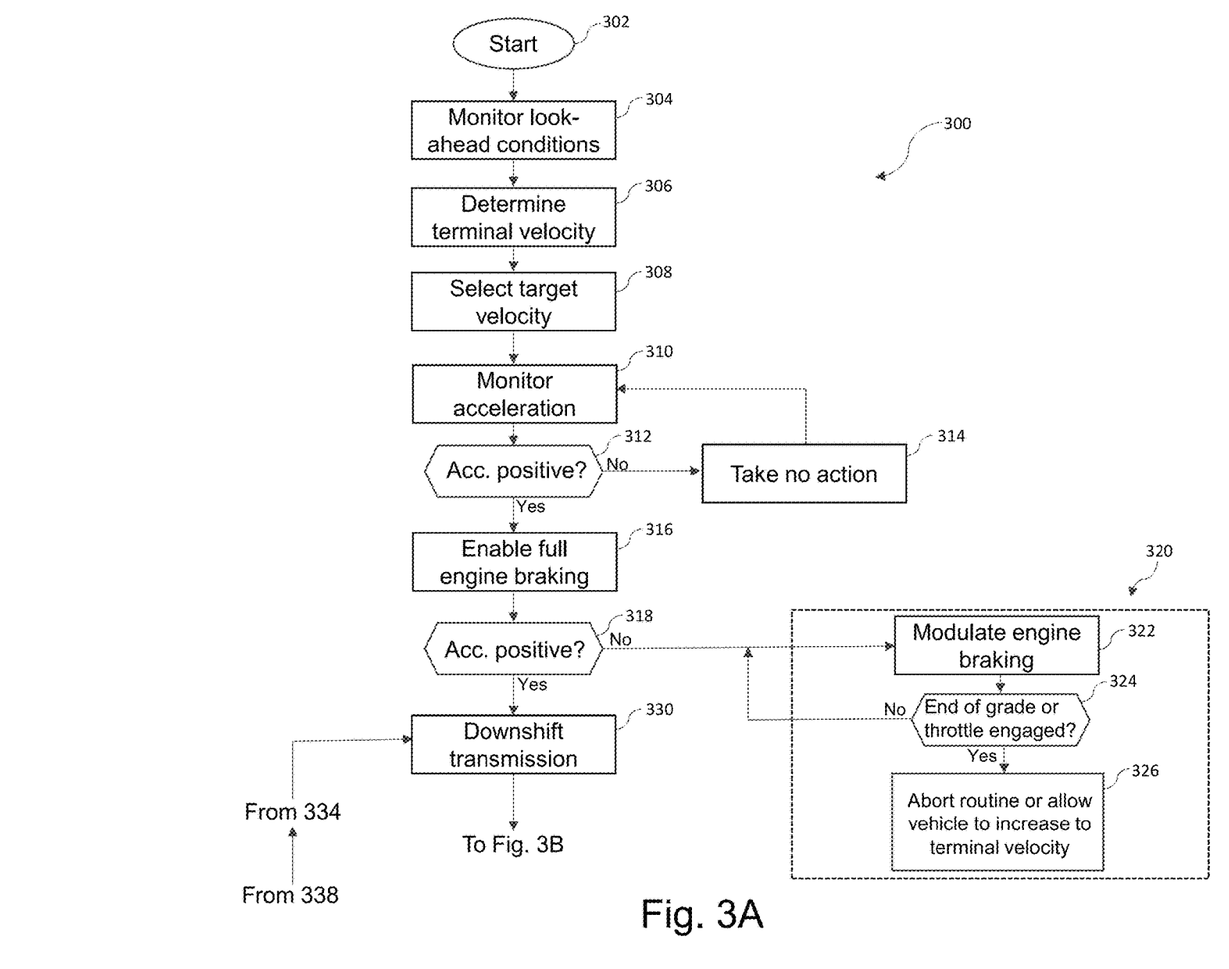
FIGS. 3A-3B is a flow diagram illustration of an example procedure for controlling a downhill speed of the vehicle.
Figure 3B:
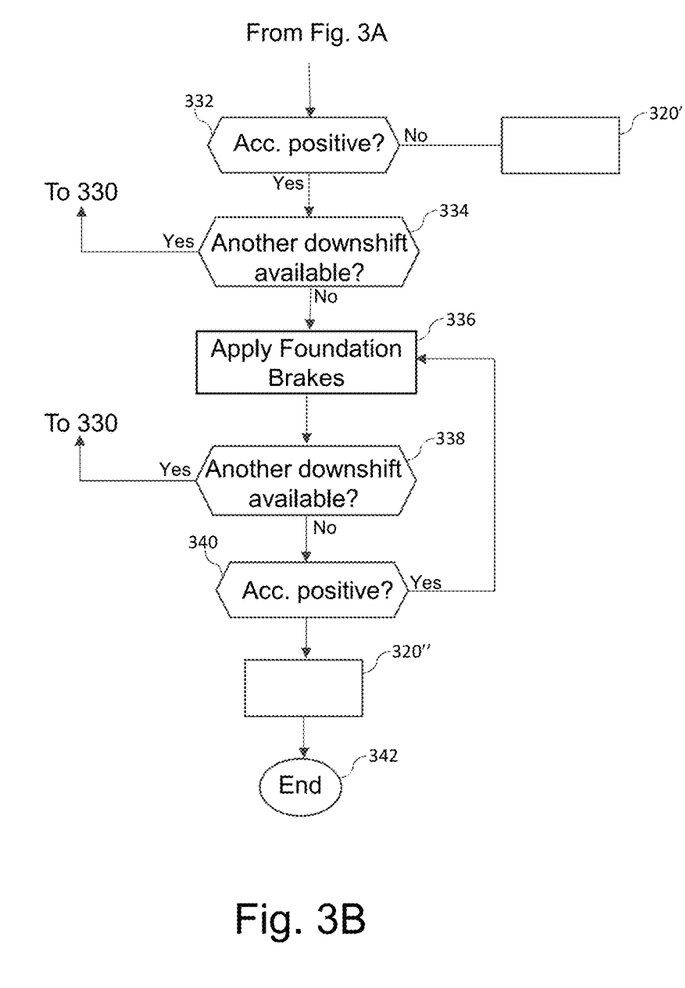

With reference to FIGS. 3A-3B, there is illustrated a flow diagram of an example procedure 300 for controlling a speed of vehicle 100 along a downhill segment of a route, such as downhill route segment 206 of route 202. Procedure 300 begins at operation 302, in which a control routine is started for controlling the vehicle speed along the downhill route segment 206 in response to a target speed for vehicle 100. The target speed may be, for example, a lesser of the terminal speed for vehicle 100 and the speed limit along the downhill route segment, as discussed above.

Operation 302 may begin by interpreting a key-on event, completion of a cycle, a restarting procedure 300, by initiation of a vehicle operation such as a motoring condition, or by initiation by the vehicle operator or a technician. As used herein, a motoring condition is an operating condition in which the prime mover 104 is not demanding fuel to propel the vehicle 100, such as when the throttle is closed, the accelerator pedal 145 is lifted, the accelerator pedal 145 resides in a deadband region not demanding fuel, and/or when the accelerator pedal 145 is not depressed.

Procedure 300 continues from operation 302 at operation 304. Operation 304 includes monitoring look ahead conditions 204 along the route 202, such as approaching route grade, road slope, grade length, and vehicle speed limits, to name a few. It is contemplated that in certain embodiments, the look ahead conditions 204 may include the route grade for the entire route 202. In other embodiments, the look ahead conditions 204 are for a portion of the route, such as the downhill route segment 206 for which the vehicle speed is to be controlled using procedure 300.

Procedure 300 continues from operation 304 to operation 306, where the terminal speed for the vehicle is determined. The terminal speed may be determined in response to vehicle configuration, vehicle mass, road slope, and other conditions, as discussed above. The terminal speed may be continually updated during operation of vehicle 100, or periodically updated in response to the input of operating parameters into the ECS along the route.

Procedure 300 continues from operation 306 to operation 308, where the target speed is selected. In an embodiment, the target speed is selected as the lesser of the terminal speed and the speed limit for the vehicle 100 along the route segment 206. In an embodiment, the terminal speed is less than the speed limit, and the terminal speed is selected for the target speed. In an embodiment, the terminal speed is a physics based calculation that determines a safe speed for the vehicle 100 that enables that particular vehicle 100 to safely traverse the downhill route segment. In an embodiment, the target speed is selected as the speed limit and not the terminal speed since the speed limit along the downhill route segment is less than the terminal speed.

From operation 308, procedure 300 continues to operation 310, where vehicle acceleration during the motoring of vehicle 100 along downhill route segment 206 is monitored. Procedure 300 continues at conditional 312 to determine if acceleration is positive. If conditional 312 is NO, then no action is taken at operation 314 and procedure 300 continues to monitor vehicle acceleration at operation 310. If conditional 312 is YES, indicating the motoring vehicle is accelerating along the downhill route segment 206, procedure 300 continues at operation 316 to enable engine braking of the vehicle 100. The engine braking can be enabled at full engine braking power in order to slow the rate of acceleration as much as possible without application of the vehicle's foundation brakes in order to attempt to control the vehicle speed toward the target speed selected at operation 308.

From operation 316, procedure 300 continues to conditional 318 to determine if vehicle acceleration is still positive after applying full engine braking power. If conditional 318 is NO, then procedure 300 continues in subroutine 320 to control the speed of vehicle 100 by modulating engine braking downwardly from the full engine braking power to achieve the target speed.

Subroutine 320 includes an operation 322 to modulate engine braking to achieve the target speed for vehicle 100 along the downhill route segment 206. Subroutine 320 continues from operation 322 at conditional 324 to determine if either the end of the downhill route segment has been reached, or if the accelerator pedal 145 is depressed. If conditional 324 is NO, subroutine 320 continues at operation 322. If conditional 324 is YES, subroutine 320 continues at operation 326. Operation 326 aborts the subroutine 320 if the end of downhill route segment is reached, or if the accelerator pedal 145 is depressed. In response to the accelerator pedal 145 being depressed, procedure 300 can include a governor that only allows the vehicle speed to increase to no greater than the maximum calculated terminal speed for the current grade along which the vehicle 100 is traveling.

If conditional 318 is YES, then procedure 300 continues at operation 330 to downshift the transmission to a target gear. In an embodiment, the target gear is the next lower gear. In an embodiment, the target gear is at least two gears lower than the current gear depending on the available speed range for the prime mover 104. Any suitable technique for selecting the optimal gear for the downshift at operation 330 is contemplated.

From operation 330, procedure 300 continues at conditional 332 to determine if acceleration of vehicle 100 along the downhill route segment 206 is positive after the downshift in gear or gears. If conditional 332 is NO, procedure 300 continues at a second subroutine 320' that is like subroutine 320 discussed above in which the full engine braking power is modulated to achieve the target speed until the end of the downhill route segment 206 is reached or until the accelerator pedal 145 is depressed.

If conditional 332 is YES, procedure 300 continues at conditional 334 to determine if another downshift in gear is available. If conditional 334 is YES due to the downshift at operation 330 not stopping acceleration, procedure 300 returns to operation 330 to downshift to the next lower gear. If conditional 334 is NO, procedure 300 continues at operation 336 to apply the vehicle's foundation brakes to slow the vehicle 100. Therefore, the full range of engine braking power and gear downshifting capability is utilized before procedure 300 resorts to using the vehicle's foundation brakes to slow vehicle 100.

Procedure 300 continues from operation 336 at conditional 338 to determine if another downshift is available after slowing the vehicle 100 with the foundation brakes. If the speed of the vehicle 100 after foundation braking allows a downshift to a next lower gear at conditional 338, procedure 300 returns to operation 330 to execute another downshift to slow the vehicle. This allows the use of the foundation braking to be terminated if another downshift becomes available as a result of the lower vehicle speed.

If conditional 338 is NO, procedure 300 continues at conditional 340 to determine if acceleration is positive. If conditional 340 is YES, procedure 300 returns to operation 336 to apply the foundation brakes of the vehicle. If conditional 340 is NO, then procedure 300 enters a subroutine 320" that is like subroutine 320 to modulate the full engine braking to achieve the target speed until the end of the downhill route segment 206 is reached, or until accelerator pedal 145 is depressed. Procedure 300 is then complete and ends at operation 342, where procedure 300 may be restarted as discussed above with respect to operation 302.

A number of exemplary embodiments shall now be further described. In an embodiment, an ECS is in operative communication with the prime mover 104, the transmission 106, and the foundation brakes 124a, 124b, 127a, 127b. The ECS includes a VSM controller 150 configured to determine a target speed for the vehicle 100 along a downhill route segment 206. The VSM controller 100 is configured to, in response to a motoring condition of the prime mover 104 and an acceleration of the vehicle 100 being positive, apply an engine braking power using engine braking system 129 to slow an acceleration of the vehicle 100 without applying the foundation brakes. The VSM controller is also configured to, in response to the acceleration of the vehicle 100 being positive after engine braking, downshift the transmission 106 to a lower gear to slow the acceleration without applying the foundation brakes. The VSM controller 100 is also configured to, in response to the acceleration of the vehicle 100 being positive after downshifting, downshift the transmission 106 to a next lower gear to slow the acceleration without applying the foundation brakes 124a, 124b, 127a, 127b.

In another embodiment, a method includes operating a vehicle 100 that has a prime mover 104 in a motoring condition. The vehicle 100 also includes a transmission 106 coupled to the prime mover 104, one or more ground engaging wheels 122a, 122b, 126a, 126b coupled to the transmission 106 that are capable of being driven by the prime mover 104 through the transmission 106, and foundation brakes 124a, 124b, 127a, 127b that are actuatable to slow the one or more ground engaging wheels 122a, 122b, 1226a, 126b. The method includes determining a target speed for the vehicle 100 along a downhill route segment 206. In response to an acceleration of the vehicle 106 being positive while in the motoring condition along the downhill route segment, the method includes applying an engine braking power to slow the acceleration of the vehicle 100 without applying the foundation brakes. In response to the acceleration of the vehicle 100 being positive along the downhill route segment 206 after applying the engine braking power, the method includes downshifting the transmission 106 to a lower gear to slow the acceleration without applying the foundation brakes. In response to the acceleration of the vehicle 100 still being positive after downshifting to the lower gear, the method includes downshifting the transmission 106 to a next lower gear to slow the acceleration without applying the foundation brakes 124a, 124b, 127a, 127b.

In an embodiment, the vehicle mass and road slope/grade are both relatively low. Therefore, even if there is headroom (available engine speed range) to execute a multiple gear downshift, a single downshift may be most desirable and therefore a single downshift is executed after applying full engine braking power. In an embodiment, vehicle mass and road slope are high enough such that more than a single downshift is possible due to the available engine speed range. Therefore, the lowest gear (highest numeric ratio) possible is automatically downshifted to and intervening gears are skipped in order possible to achieve the maximum retarding performance of the powertrain 102. In other embodiments, downshifts can be scheduled as a function of vehicle acceleration rate, vehicle mass, road slope and use of pre-vision/satellite and other look ahead data to make determinations on retarding power requirements and target gear position needed to achieve a target or terminal grade descent velocity/speed.

In an embodiment, the foundation brakes of vehicle 100 are not used so long as engine braking power and gear downshifts are available to slow vehicle 100. The current speed of vehicle 100 is automatically evaluated against a target or terminal speed without any operator input or request to adjust the vehicle speed. The transmission gear selection logic places the prime mover 104 at the highest possible speed to achieve maximum retarding power. If the target speed still cannot be achieved, only then are the foundation brakes applied to slow the vehicle to a speed where an additional downshift is possible.

In an embodiment, following the downshift, current versus target vehicle speeds/velocities are re-evaluated. In scenarios where the target speed is achievable, the powertrain retarding power is modulated to maintain the target speed. If the target speed cannot be achieved due to lack of sufficient retarding power/tractive effort to slow the vehicle 100 to the target speed, the foundation brakes can again be applied and the vehicle s100 lowed further until an additional downshift could be completed. This process can repeat until the target or terminal speed is achieved.

The present disclose provides a safe grade descent of a downhill route segment of any vehicle regardless of the skill level of the operator. In addition, the foundation brakes are preserved and maintained in a cool condition in the event an emergency stop or evasive maneuver is required.

Various aspects of the present disclosure are contemplated. According to one aspect, a vehicle is provided that includes a powertrain including a prime mover and a transmission coupled to the prime mover, one or more ground engaging wheels coupled to the transmission that are capable of being driven by the prime mover through the transmission, foundation brakes that are actuatable to slow the one or more ground engaging wheels, and an electronic control system in operative communication with the prime mover, the transmission, and the foundation brakes.

In an embodiment, the electronic control system includes a vehicle speed management controller configured to: (a) determine a target speed for the vehicle along a downhill route segment, (b) in response to a motoring condition of the prime mover and an acceleration of the vehicle being positive along the downhill route segment, apply an engine braking power to slow an acceleration of the vehicle without applying the foundation brakes, (c) in response to the acceleration of the vehicle being positive after (b), downshift the transmission to a lower gear to slow the acceleration without applying the foundation brakes, and (d) in response to the acceleration of the vehicle being positive after (c), downshift the transmission to a next lower gear to slow the acceleration without applying the foundation brakes.

In an embodiment, the electronic control system is configured to determine the next lower gear is available after (c) and before (d). In a further embodiment, the electronic control system is configured to apply the foundation brakes if the next lower gear is not available after (c) and before (d) to slow the vehicle and enable the downshift to the next lower gear at (d).

In an embodiment, the electronic control system is configured to: (e) in response to the acceleration of the vehicle being positive after (d), determine if another lower gear is available, and (f) apply the foundation brakes after (e) in response to determining the another lower gear is not available.

In an embodiment, the electronic control system is configured to: (e) in response to the acceleration of the vehicle being positive after (d), determine another lower gear is available, and (f) in response to determining the another lower gear is available in (e), downshift the transmission to the another lower gear.

In an embodiment, the electronic control system is configured to: (e) in response to the acceleration of the vehicle being not positive after (d), modulate the engine braking power to achieve the target speed. In a further embodiment, the electronic control system is configured to: (f) terminate engine braking in response to acceleration an accelerator being depressed or reaching an end of the downhill route segment.

In an embodiment, the electronic control system is configured to select the target speed from a minimum of a speed limit along the downhill route segment and a terminal speed of the vehicle along the downhill route segment. In a further embodiment, the terminal speed is determined as a function of a mass of the vehicle and a grade of the downhill route segment.

According to another aspect, a method includes operating a vehicle including a prime mover in a motoring condition. The vehicle includes a transmission coupled to the prime mover, one or more ground engaging wheels coupled to the transmission that are capable of being driven by the prime mover through the transmission, and foundation brakes that are actuatable to slow the one or more ground engaging wheels. The method further includes determining a target speed for the vehicle along a downhill route segment; in response to an acceleration of the vehicle being positive while in the motoring condition, applying an engine braking power to slow the acceleration of the vehicle; in response to the acceleration of the vehicle being positive after applying the engine braking power, downshifting the transmission to a lower gear; and in response to the acceleration of the vehicle being positive after downshifting to the lower gear, downshifting the transmission to a next lower gear.

In an embodiment, the method includes determining the next lower gear is available after downshifting to the lower gear and before downshifting to the next lower gear. In a further embodiment, the method includes applying the foundation brakes if the next lower gear is not available to slow the vehicle in order to enable the downshift to the next lower gear.

In an embodiment, the method includes determining if another lower gear is available in response to the acceleration of the vehicle being positive after downshifting to the next lower gear. In a further embodiment, the method includes applying the foundation brakes in response to determining the another lower gear is not available in order to slow the vehicle and enable a downshift to the another lower gear.

In an embodiment, the method includes, in response to the acceleration of the vehicle being positive after downshifting to the next lower gear, determining another lower gear is available and downshifting the transmission to the another lower gear.

In an embodiment, the method includes modulating the engine braking power to achieve the target speed in response to the acceleration of the vehicle being not positive after downshifting to the next lower gear. In a further embodiment, the method includes terminating engine braking in response to an accelerator pedal being depressed or reaching an end of the downhill route segment. In yet a further embodiment, the method includes selecting the target speed from a minimum of a speed limit along the downhill route segment and a terminal speed of the vehicle. In still a further embodiment, the method includes determining the terminal speed as a function of a mass of the vehicle and a grade of the downhill route segment.

According to another aspect of the present disclosure a controller is provided that is configured to execute any of the control techniques and methods described herein.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A vehicle, comprising:
a powertrain including a prime mover and a transmission coupled to the prime mover;
one or more ground engaging wheels coupled to the transmission that are capable of being driven by the prime mover through the transmission;
foundation brakes that are actuatable to slow the one or more ground engaging wheels; and
an electronic control system in operative communication with the prime mover, the transmission, and the foundation brakes, the electronic control system comprising a vehicle speed management controller configured to:
(a) determine a target speed for the vehicle along a downhill route segment,
(b) in response to a motoring condition of the prime mover and an acceleration of the vehicle being positive along the downhill route segment, apply an engine braking power to slow an acceleration of the vehicle without applying the foundation brakes,
(c) in response to the acceleration of the vehicle being positive after (b), downshift the transmission to a lower gear to slow the acceleration without applying the foundation brakes, and
(d) in response to the acceleration of the vehicle being positive after (c), downshift the transmission to a next lower gear to slow the acceleration without applying the foundation brakes, wherein the electronic control system is configured to determine the next lower gear is available after (c) and before (d),
wherein the electronic control system is configured to apply the foundation brakes if the next lower gear is not available after (c) and before (d) to slow the vehicle and enable the downshift to the next lower gear at (d).

2. The vehicle of claim 1, wherein the electronic control system is configured to:
(e) in response to the acceleration of the vehicle being positive after (d), determine another lower gear is available, and
(f) in response to determining the another lower gear is available in (e), downshift the transmission to the another lower gear.

3. The vehicle of claim 1, wherein the electronic control system is configured to:
(e) in response to the acceleration of the vehicle being not positive after (d), modulate the engine braking power to achieve the target speed.

4. A vehicle, comprising:
a powertrain including a prime mover and a transmission coupled to the prime mover;
one or more ground engaging wheels coupled to the transmission that are capable of being driven by the prime mover through the transmission;
foundation brakes that are actuatable to slow the one or more ground engaging wheels; and
an electronic control system in operative communication with the prime mover, the transmission, and the foundation brakes, the electronic control system comprising a vehicle speed management controller configured to:
(a) determine a target speed for the vehicle along a downhill route segment,
(b) in response to a motoring condition of the prime mover and an acceleration of the vehicle being positive along the downhill route segment, apply an engine braking power to slow an acceleration of the vehicle without applying the foundation brakes,
(c) in response to the acceleration of the vehicle being positive after (b), downshift the transmission to a lower gear to slow the acceleration without applying the foundation brakes,
(d) in response to the acceleration of the vehicle being positive after (c), downshift the transmission to a next lower gear to slow the acceleration without applying the foundation brakes,
(e) in response to the acceleration of the vehicle being positive after (d), determine if another lower gear is available, and
(f) apply the foundation brakes after (e) in response to determining the another lower gear is not available.

5. A vehicle, comprising:
a powertrain including a prime mover and a transmission coupled to the prime mover;
one or more ground engaging wheels coupled to the transmission that are capable of being driven by the prime mover through the transmission;
foundation brakes that are actuatable to slow the one or more ground engaging wheels; and
an electronic control system in operative communication with the prime mover, the transmission, and the foundation brakes, the electronic control system comprising a vehicle speed management controller configured to:
(a) determine a target speed for the vehicle along a downhill route segment,
(b) in response to a motoring condition of the prime mover and an acceleration of the vehicle being positive along the downhill route segment, apply an engine braking power to slow an acceleration of the vehicle without applying the foundation brakes,
(c) in response to the acceleration of the vehicle being positive after (b), downshift the transmission to a lower gear to slow the acceleration without applying the foundation brakes,
(d) in response to the acceleration of the vehicle being positive after (c), downshift the transmission to a next lower gear to slow the acceleration without applying the foundation brakes,
(e) in response to the acceleration of the vehicle being not positive after (d), modulate the engine braking power to achieve the target speed, and
(f) terminate engine braking in response to an accelerator being depressed or reaching an end of the downhill route segment.

6. The vehicle of claim 5, wherein the electronic control system is configured to select the target speed from a minimum of a speed limit along the downhill route segment and a terminal speed of the vehicle along the downhill route segment.

7. The vehicle of claim 6, wherein the terminal speed is determined as a function of a mass of the vehicle and a grade of the downhill route segment.

8. A method, comprising:
operating a vehicle including a prime mover in a motoring condition, the vehicle including a transmission coupled to the prime mover, one or more ground engaging wheels coupled to the transmission that are capable of being driven by the prime mover through the transmission, and foundation brakes that are actuatable to slow the one or more ground engaging wheels;
determining a target speed for the vehicle along a downhill route segment;
in response to an acceleration of the vehicle being positive while in the motoring condition, applying an engine braking power to slow the acceleration of the vehicle;

in response to the acceleration of the vehicle being positive after applying the engine braking power, downshifting the transmission to a lower gear;

determining the next lower gear is available after downshifting to the lower gear and before downshifting to the next lower gear;

applying the foundation brakes if the next lower gear is not available to slow the vehicle in order to enable the downshift to the next lower gear; and in response to the acceleration of the vehicle being positive after downshifting to the lower gear, downshifting the transmission to a next lower gear.

9. The method of claim 8, further comprising, in response to the acceleration of the vehicle being positive after downshifting to the next lower gear, determining another lower gear is available and downshifting the transmission to the another lower gear.

10. A method, comprising:
operating a vehicle including a prime mover in a motoring condition, the vehicle including a transmission coupled to the prime mover, one or more ground engaging wheels coupled to the transmission that are capable of being driven by the prime mover through the transmission, and foundation brakes that are actuatable to slow the one or more ground engaging wheels;
determining a target speed for the vehicle along a downhill route segment;
in response to an acceleration of the vehicle being positive while in the motoring condition, applying an engine braking power to slow the acceleration of the vehicle;
in response to the acceleration of the vehicle being positive after applying the engine braking power, downshifting the transmission to a lower gear;
in response to the acceleration of the vehicle being positive after downshifting to the lower gear, downshifting the transmission to a next lower gear;
determining if another lower gear is available in response to the acceleration of the vehicle being positive after downshifting to the next lower gear; and
applying the foundation brakes in response to determining the another lower gear is not available in order to slow the vehicle and enable a downshift to the another lower gear.

11. A method, comprising:
operating a vehicle including a prime mover in a motoring condition, the vehicle including a transmission coupled to the prime mover, one or more ground engaging wheels coupled to the transmission that are capable of being driven by the prime mover through the transmission, and foundation brakes that are actuatable to slow the one or more ground engaging wheels;
determining a target speed for the vehicle along a downhill route segment;
in response to an acceleration of the vehicle being positive while in the motoring condition, applying an engine braking power to slow the acceleration of the vehicle;
in response to the acceleration of the vehicle being positive after applying the engine braking power, downshifting the transmission to a lower gear;
in response to the acceleration of the vehicle being positive after downshifting to the lower gear, downshifting the transmission to a next lower gear;
modulating the engine braking power to achieve the target speed in response to the acceleration of the vehicle being not positive after downshifting to the next lower gear; and
terminating engine braking in response to an accelerator pedal being depressed or reaching an end of the downhill route segment.

12. The method of claim 11, further comprising selecting the target speed from a minimum of a speed limit along the downhill route segment and a terminal speed of the vehicle.

13. The method of claim 12, further comprising determining the terminal speed as a function of a mass of the vehicle and a grade of the downhill route segment.

14. A controller apparatus, the controller apparatus configured to:
determine a target speed for a vehicle along a downhill route segment, the vehicle including foundation brakes;
in response to an acceleration of the vehicle being positive while in a motoring condition, apply an engine braking power of an engine of the vehicle to slow the acceleration of the vehicle;
in response to the acceleration of the vehicle being positive after applying the engine braking power, downshift a transmission of the vehicle to a lower gear;
in response to the acceleration of the vehicle being positive after downshifting to the lower gear, determine a next lower gear is available based on a vehicle speed and then downshifting the transmission to the next lower gear; and
apply the foundation brakes if the next lower gear is not available to slow the vehicle in order to enable the downshift to the next lower gear.

15. The controller apparatus of claim 14, wherein the controller apparatus is configured to:
determine if another lower gear is available in response to the acceleration of the vehicle being positive after downshifting to the next lower gear; and
apply the foundation brakes in response to determining the another lower gear is not available in order to slow the vehicle and enable a downshift to the another lower gear.

16. The controller apparatus of claim 14, wherein the controller apparatus is configured to:
modulate the engine braking power to achieve the target speed in response to the acceleration of the vehicle being not positive after downshifting to the next lower gear; and
terminate engine braking in response to an accelerator pedal being depressed or reaching an end of the downhill route segment.

* * * * *